Figure 3:
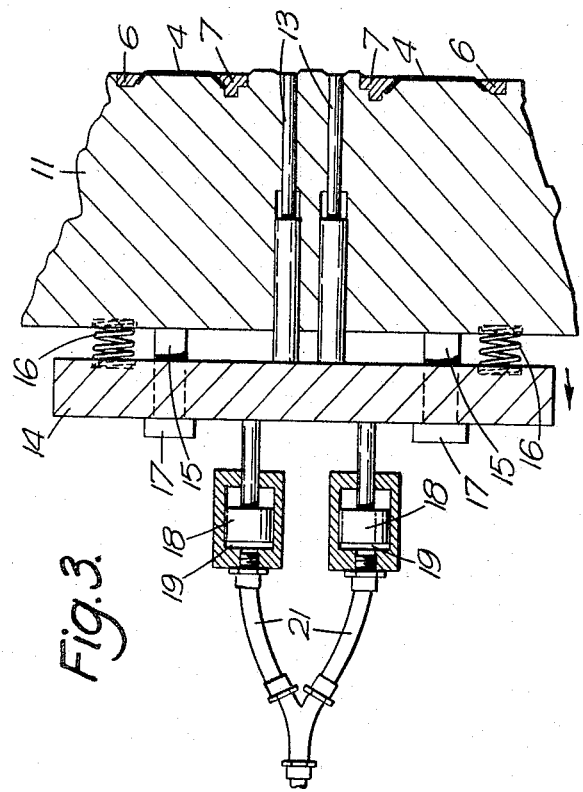

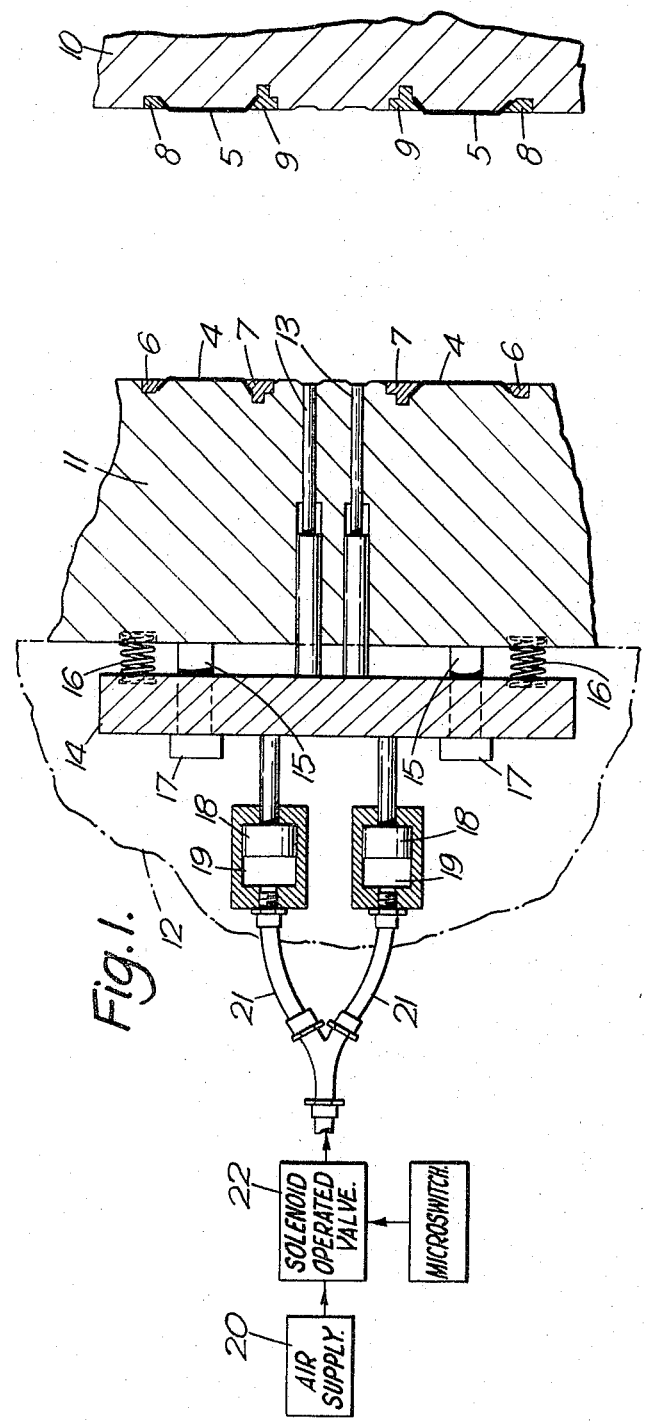

United States Patent Office

3,315,302
Patented Apr. 25, 1967

3,315,302
EJECTOR MEANS FOR USE IN AN INJECTION MOLDING MACHINE FOR MOLDING PHONOGRAPH RECORD DISKS
Alan Phillipson, Cyril Newman, and Harry Cheesman, all of London, England, assignors to Decca Limited, London, England, a British company
Filed May 3, 1965, Ser. No. 452,538
Claims priority, application Great Britain, May 12, 1964, 19,706/64; Jan. 27, 1965, 3,665/65
8 Claims. (Cl. 18—2)

This invention relates to ejector means for use in an injection moulding machine for making phonograph record disks.

An injection moulding machine may be used for making a phonograph record by injecting a suitable material such as that described and claimed in the specification of co-pending application No. 370,939 filed May 28, 1964, by I. E. Mosley and assigned to Decca Limited, the assignee of the present application; between suitable die plates. These die plates may carry matrices so that the required sound track is formed on the record by the injection moulding operation. Alternatively a blank record may be produced with a smooth surface on which the sound track can be subsequently impressed as is described in the specifications of co-pending applications Nos. 383,839, filed on July 20, 1964, 395,875, 395,872, 395,873 and filed on Sept. 11, 1964, by A. Phillipson, B. H. R. Spiller, R. Smith and H. Cheesman and all assigned to Decca Limited. In its broadest aspect this invention contemplates the provision in an injection molding machine for molding a phonograph record disk the combination of a horizontally movable die and a fixed die forming a two part operable mold for molding said disk, means for an injecting molding material into said mold when the dies are close together, means for moving said movable die away from the fixed die to open the mold ejector pins for releasing the disk from the movable die which ejector pins are mounted for withdrawal through the movable die, means for holding the ejector pins stationary as the mold is opened, and means operative before the mold is fully opened to move said ejector pins rearwardly with respect to the movable die whereby they are withdrawn from the disk immediately after the disk has been released from the movable die.

More specifically the invention provides in an injection molding machine for molding a phonograph record disk, the combination of a horizontally movable die and a fixed die forming a two part operable mold for molding said disk, means for injecting molding material into said mold when the dies are close together, means for moving said movable die away from the fixed die to open said mold, ejector pins for releasing the disk from the movable die, spring means urging the ejector pins rearwardly with respect to said movable die, a fixed air-operated piston and cylinder assembly arranged when air pressure is applied to said cylinder to hold said ejector pins stationary in a forward operative position as said movable die is moved back and means for releasing the air pressure in said cylinder immediately after said ejector pins are fully extended with respect to said movable die so that said ejector pins are then retracted by the action of said spring means.

In one arrangement, the ejector pins are carried on an ejector plate which is movably mounted on the movable die plate and spring means are provided urging the ejector plate rearwardly with respect to the movable die plate against stops on the movable die plate and the ejector plate is arranged to come into contact with a piston or pistons of said air operated piston and cylinder assembly as the movable die plate moves rearwardly whereby the ejector plate is held stationary against the spring force during further movement of the movable die so that the ejector pins release the disk from the movable die.

The air may be released from the cylinder by a solenoid-operated valve controlled by a microswitch operated by the movable die plate or platen or other movable part of the machine. Provision may be made for automatically re-admitting air to the cylinder to restore the ejector pins to the operative position subsequently during the cycle of operation of the machine. More than one air-operated piston and cylinder assembly may be provided and each may operate more than one ejector pin. In a typical construction two air-operated piston and cylinder assemblies are provided actuating an ejector plate carrying four ejector pins.

The record disk falls away, under the influence of gravity, from the movable die plate when released and it is readily possible to ensure that the ejector pins are retracted so rapidly that there is no possibility of them scratching the record surface.

Figure 2:
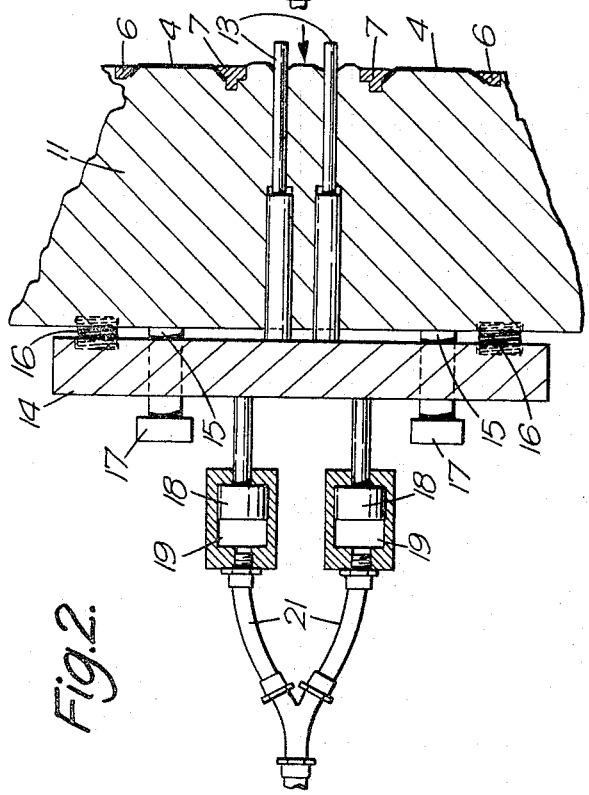

The following is a description of one embodiment of the invention, reference being made to the accompanying drawings, in which:

FIGURE 1 is a diagram illustrating part of an injection moulding machine for moulding phonograph records or blank disks for the subsequent embossing of sound tracks to produce phonograph records; and FIGURES 2 and 3 are diagrams showing the apparatus of FIGURE 1 at later times during a cycle of operation of the machine.

Referring to the drawings there are shown two record matrices 4, 5 which are each secured by two clamps 6, 7 and 8, 9 respectively on facing die plates 10, 11 of an injection moulding machine. In the drawings, there are shown parts of the fixed die plate 10 and moving die plate 11. The fixed die plate 10 is mounted on a fixed platen (not shown) and the moving die plate 11 is carried on a movable platen 12 which, in the conventional manner, has a central aperture to accommodate an ejector assembly. It is the usual practice to have a number of ejector pins which are rigidly mounted on a fixed part of the machine so that, as the die plate moves back, the ends of the pins protrude through the die plate to force the article being moulded away from the die plate. In accordance with the present invention, the ejector pins are retractable and, in the embodiment illustrated, four ejector pins 13, which are positioned evenly around the centre of the disk being moulded, are carried on an ejector plate 14. This plate is slidable on four studs 15 on the moving die plate 11. The ejector plate 14 is rectangular and four helical compression springs 16 located near the corners of the ejector plate 14 urge the ejector plate 14 away from the die plate 11 towards stops 17 on the studs 15.

Mounted on a fixed part of this machine, so that their position is fixed relative to the fixed die plate are cylinders 19 of two air-operated piston and cylinder assemblies. These are supplied with compressed air from an air supply source 20 via pipes 21. The piston and cylinder assemblies are single-acting, the admission of air to the cylinders urging the pistons 18 in these cylinders 19 forwardly, that is to say towards the die plate 11.

FIGURE 1 illustrates the apparatus when the moving die plate is almost fully open, at the instant when the ejector plate 14 is just meeting the pistons 18. The pistons 18 are energised forwardly and are at the forward ends of their cylinders and the ejector plate 14 is held back against the stops 17 by the springs 16. As the die 11 moves further back, the ejector plate 14 is held stationary by the pistons 18, the springs 16 being compressed. Thus the ejector pins remain stationary and so protrude from the die face as shown in FIGURE 2. The ejector pins 13 thus force the moulded disk off the moving die. Immediately after the disk has been ejected, however, the pins 13 are retracted by releasing the air from the cylinders 19 so that the pistons 18 can move backwards in the cylinders under the force of the springs 16 as shown in FIGURE 3. These springs cause the ejector pins to be retracted quickly thereby avoiding any danger of the pins scratching the surface of the disk as it falls away. The release of the air from the cylinders 19 is conveniently effected by means of a solenoid-operated valve 22 controlled by a microswitch 23 which may be operated by the moving die plate 11 or moving platen 12 or any other similarly moving part of the machine. The valve 22 may be a change-over valve so that this microswitch serves also to restore the air supply to the cylinders 19 when the die plate 11 subsequently moves forward during the next cycle of operation.

We claim:

1. In an injection moulding machine for moulding a phonograph record disk, the combination of a horizontally movable die and a fixed die forming a two part operable mould for moulding said disk, means for injecting moulding material into said mould when the dies are closed together, means for moving said movable die away from the fixed die to open the mould ejector pins for releasing the disk from the movable die which ejector pins are mounted for withdrawal through the movable die, means for holding the ejector pins stationary as the mold is opened, and means operative before the mould is fully opened to move said ejector pins rearwardly with respect to the movable die whereby they are withdrawn away from the disk immediately after the disk has been released from the movable die.

2. In an injection moulding machine for moulding a phonograph record disk, the combination of a horizontally movable die and a fixed die forming a two part operable mould for moulding said disk, means for injecting moulding material into said mould when the dies are closed together, means for moving said movable die away from the fixed die to open said mould, ejector pins for releasing the disk from the movable die, spring means urging the ejector pins rearwardly with respect to said movable die, a fixed air-operated piston and cylinder assembly arranged, when air pressure is applied to said cylinder to hold said ejector pins stationary in a forward operative position as said movable die is moved back and means for releasing the air pressure in said cylinder immediately after said ejector pins are fully extended with respect to said movable die so that said ejector pins are then retracted by the action of said spring means.

3. The combination as claimed in claim 2 wherein said ejector pins are slidably carried on said movable die.

4. The combination as claimed in claim 2 wherein said ejector pins are carried on an ejector plate which is movably mounted on said movable die plate and wherein spring means are arranged to urge said ejector plate rearwardly with respect to said movable die and wherein stops are provided on the movable die for limiting rearward movement of said ejector plate with respect to said movable die and wherein said ejector plate is arranged to come into contact with said piston of said air-operated piston and cylinder assembly as said movable die moves rearwardly whereby said ejector plate is held stationary against the spring force during further movement of said movable die so that said ejector pins release the disk from the movable die.

5. The combination as claimed in claim 2 wherein a microswitch is arranged to be operated by a movable part of the machine as the dies become fully open and wherein said means for releasing the air pressure from the cylinder is a solenoid-operated valve controlled by said microswitch.

6. In an injection moulding machine for moulding a phonograph record disk, the combination of a horizontally movable die and a fixed die forming a two-part operable mould for moulding said disk, means for injecting moulding material into said mould when the dies are closed together, means for moving said movable die towards and away from the fixed die, at least one ejector pin for releasing the disk from the movable die, a support in which said ejector pin is mounted so as to be movable with respect to the moving die, said ejector pin support being movable with said moving die, spring means urging the ejector pin rearwardly with respect to said movable die, a fluid-operated piston and cylinder assembly fixed with respect to the moving die and arranged so that the piston when extended holds the ejector pin stationary by movement relative to the moving die against the spring force as the moving die travels rearwardly, and means for holding said piston extended during the rearward travel of said moving die but releasing said piston for retraction during the final stages of said rearward travel whereby said ejector pin is retracted by the action of said spring means.

7. The combination as claimed in claim 6 wherein said piston and cylinder assembly is air-operated and wherein means are provided for releasing air from said cylinder to allow said piston to be retracted during the final stage of rearward movement of said moving die.

8. The combination as claimed in claim 7 wherein means are provided for automatically readmitting air to the cylinder to restore the ejector pin to the operative position subsequently during the cycle of operation of the injection moulding machine.

References Cited by the Examiner

UNITED STATES PATENTS

| | | | |
|---|---|---|---|
| 2,900,662 | 8/1959 | Scherry | 18—2 X |
| 2,992,455 | 7/1961 | Salzman | 18—5.3 |
| 3,049,758 | 8/1962 | Drevalas | 18—2 X |
| 3,091,808 | 4/1963 | Trueblood | 18—1 |
| 3,142,863 | 8/1964 | Mazzoni | 18—2 |

WILLIAM J. STEPHENSON, *Primary Examiner.*